US010622790B2

(12) United States Patent
Kim

(10) Patent No.: US 10,622,790 B2
(45) Date of Patent: Apr. 14, 2020

(54) ARC VENTILATION SYSTEM OF MULTI STAGE DISTRIBUTING BOARD

(71) Applicant: LSIS CO., LTD., Anyang-si, Gyeonggi-do (KR)

(72) Inventor: Jongdoo Kim, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/225,870

(22) Filed: Dec. 19, 2018

(65) Prior Publication Data
US 2019/0379184 A1 Dec. 12, 2019

(30) Foreign Application Priority Data
Jun. 12, 2018 (KR) .................. 10-2018-0067616

(51) Int. Cl.
*H02B 13/025* (2006.01)
*H02B 1/30* (2006.01)
(Continued)

(52) U.S. Cl.
CPC .......... *H02B 13/025* (2013.01); *H01H 9/342* (2013.01); *H02B 1/06* (2013.01); *H02B 1/202* (2013.01);
(Continued)

(58) Field of Classification Search
CPC .............................................. H01H 9/30–465
(Continued)

(56) References Cited

U.S. PATENT DOCUMENTS 7,236,352 B2 * 6/2007 Dalis ................... H02B 13/025
174/17 VA
8,785,770 B2 * 7/2014 Gingrich ............... H02B 1/565
174/17 VA
(Continued)

FOREIGN PATENT DOCUMENTS

JP 2018057063 A 4/2018
KR 101622445 5/2016
KR 2020170000349 1/2017

OTHER PUBLICATIONS

LSIS, Co., Ltd; "2018 IEEE PES T&D—Graphic Plan"; Partial contents of above-identified application published on Apr. 17, 2018; (4 pages).
(Continued)

*Primary Examiner* — Zachary Pape
(74) *Attorney, Agent, or Firm* — K&L Gates LLP

(57) ABSTRACT

The present invention relates to an arc ventilation system of a multi-stage distributing board, and more particularly, to an arc ventilation system of a multi-stage distributing board having an arc ventilation detour path, capable of preventing an arc generated in a lower compartment from damaging an upper compartment. The arc ventilation system of a multi-stage distributing board according to an embodiment of the present invention includes a first compartment provided at a first stage of an enclosure of the distributing board, a second compartment provided at a second stage located above the first stage, a side arc ventilation compartment provided at one side of the first compartment and the second compartment, and a middle arc induction compartment provided between the first compartment and the second compartment and communicating with the side arc ventilation compartment.

14 Claims, 9 Drawing Sheets

(51) Int. Cl.
  *H02B 1/20* (2006.01)
  *H01H 9/34* (2006.01)
  *H02B 1/06* (2006.01)
  *H01H 33/53* (2006.01)
  *H02B 1/56* (2006.01)
(52) U.S. Cl.
  CPC .............. *H02B 1/30* (2013.01); *H01H 33/53* (2013.01); *H02B 1/565* (2013.01)
(58) Field of Classification Search
  USPC ................................................ 361/600–678
  See application file for complete search history.

(56) References Cited

U.S. PATENT DOCUMENTS

| | | | |
|---|---|---|---|
| 8,791,361 B2 * | 7/2014 | Gingrich | ............... H02B 1/565 174/17 VA |
| 9,577,412 B2 * | 2/2017 | Prakash | ............... H02B 13/025 |
| 2017/0256922 A1 | 9/2017 | Rajauria et al. | |

OTHER PUBLICATIONS

Korean Office Action for related Korean Application No. 10-2017-0067616; action dated Jul. 22, 2019; (5 pages).
Korean Notice of Allowance for related Korean Application No. 10-2018-0067616; action dated Dec. 31, 2019; (2 pages).

* cited by examiner

ARC VENTILATION SYSTEM OF MULTI STAGE DISTRIBUTING BOARD

CROSS-REFERENCE TO RELATED APPLICATION

Pursuant to 35 U.S.C. § 119(a), this application claims the benefit of an earlier filing date of and the right of priority to Korean Application No. 10-2018-0067616, filed on Jun. 12, 2018, the contents of which are incorporated by reference herein in its entirety.

BACKGROUND OF THE INVENTION

1. Field of the Invention

The present invention relates to an arc ventilation system of a multi-stage distributing board, and more particularly, to an arc ventilation system of a multi-stage distributing board having an arc ventilation bypass such that an arc generated in a lower compartment does not damage an upper compartment.

2. Description of the Related Art

In general, a distributing board (or a switchboard) is a device used for monitoring, controlling and protecting power system. The distributing board accommodates therein various electric devices such as a circuit breaker, a current transformer, and the like for driving or controlling a power plant, a substation, etc., driving an electric motor, and the like.

When an arc is generated in such distributing board due to a short-circuit, a ground fault, dielectric breakdown, or the like, arc gas of high temperature and high pressure is generated in the distributing board. The distributing board shall be capable of rapidly discharging the arc gas of high temperature and high pressure generated due to such fault to outside so as to protect electric devices thereof and lives.

Therefore, the distributing board is provided with a duct to construct a route (or path) through which arc gas is discharged. Arc gas generated inside the distributing board may be discharged to outside through the duct provided in the distributing board.

In order to reduce damage on surroundings due to high-temperature arc gas discharged to outside through a duct as an arc ventilation passage, it is necessary to cool the arc gas or delay a ventilation (or discharge) time.

Further, when arc gas is discharged to an upper part of the distributing board, it is necessary to evenly discharge the arc gas in a desired direction.

Particularly, since a multi-stage distributing board having circuit breaker rooms in upper and lower parts thereof is complicated in structure, an arc ventilation (or discharge) function is more important.

FIG. 1 shows a multi-stage distributing board structure according to the related art.

A distributing board 1 according to the related art includes a first breaker compartment 2 provided in a lower part, a second breaker compartment 3 provided in an upper part, a busbar compartment 4 and a cable compartment 5 located at the rear of the first breaker compartment 2 and the second breaker compartment 3, and the like. A low voltage device compartment 6 is interposed between the first breaker compartment 2 and the second breaker compartment 3. An arc ventilation duct 7 is provided on a rear surface of the distributing board.

A multi-stage distributing board is provided with two breaker compartments, and thus there is a high risk of arc generation. In addition, it is important to prevent an arc generated in a lower breaker compartment from affecting an upper breaker compartment.

It is difficult to achieve an effective arc ventilation function in the multi-stage distributing board with the simple arc ventilation path as shown in FIG. 1.

SUMMARY OF THE INVENTION

The present invention is to solve the aforementioned problems, and an aspect of the present invention is to provide an arc ventilation system of a multi-stage distributing board having an arc ventilation (or discharge) detour route (or path), capable of preventing arc generated in a lower compartment from damaging an upper compartment.

Another aspect of the present invention is to provide an arc ventilation system of a multi-stage distributing board, capable of securing time required for cooling high temperature arc gas discharged to outside and delaying an arc ventilation time, so as to reduce damage on surroundings due to the high temperature arc gas.

Still another aspect of the present invention is to provide an arc ventilation system of a multi-stage distributing board, capable of effectively discharging arc gas even when a plurality of distributing boards are arranged in parallel and minimizing components required for such arc gas discharge.

Still another aspect of the present invention is to provide an arc ventilation system of a multi-stage distributing board, capable of minimizing an increase in an occupied space due to an arc ventilation path.

An arc ventilation system of a multi-stage distributing board according to one embodiment of the present invention may include a first compartment provided at a first stage of an enclosure of the distributing board, a second compartment provided at a second stage located above the first stage, a side arc ventilation compartment provided at one side of the first compartment and the second compartment, and a middle arc induction compartment provided between the first compartment and the second compartment and communicating with the side arc ventilation compartment. Here, the middle arc induction compartment may be provided with first openings formed on left and right side surfaces, respectively.

In addition, the middle arc induction compartment may be provided with a plurality of first flaps rotatably installed on a lower surface thereof.

Further, the middle arc induction compartment may be provided with a second flap rotatably installed on a rear surface thereof.

A lower arc induction compartment may be provided in a lower corner of a cable compartment provided at the rear of the first compartment and the second compartment.

The middle arc induction compartment may be provided with second openings formed on left and right surfaces thereof, respectively.

The lower arc induction compartment may be provided with a third flap installed on a front surface thereof in an inclined direction.

A fourth flap, a fifth flap, and a sixth flap may be rotatably installed on upper surfaces of the second compartment, a bus bar compartment, and the cable compartment, respectively.

The side arc ventilation compartment may be divided into a plurality of compartments.

The side arc ventilation compartment may be provided with a middle arc introduction compartment at a position corresponding to the middle arc induction compartment.

The middle arc introduction compartment may have a side surface opened, and the side surface may be a surface brought into contact with the middle arc induction compartment.

The side arc ventilation compartment may be provided with a lower arc introduction compartment at a position corresponding to the lower arc induction compartment.

The lower arc introduction compartment may have a side surface opened, the side surface brought into contact with the lower arc introduction compartment.

An upper arc ventilation compartment may be provided on upper parts of the enclosure and the side arc ventilation compartment.

The enclosure may be provided in plurality arranged in parallel in a contacting manner, and the side arc ventilation compartment may be installed at each of a right side of a rightmost enclosure and a left side of a leftmost enclosure among the plurality of enclosures.

According to an arc ventilation system of a multi-stage distributing board according to each embodiment of the present invention, a middle arc induction compartment is provided between an upper compartment and a lower compartment so as to prevent an arc generated in the lower compartment from damaging the upper compartment.

Also, since an arc gas introduced into the middle arc induction compartment flows upward through a side arc ventilation compartment, a time required for cooling the arc gas can increase.

Thus, the arc gas generated in the lower compartment can be effectively discharged and cooled without causing damage on the upper compartment, owing to a bypass or detour route formed by the middle arc induction compartment and the side arc ventilation compartment.

In addition, a lower arc induction compartment is provided beneath a cable compartment so that an arc generated in a bus bar compartment or the cable compartment is effectively ventilated to the side arc ventilation compartment.

Also, an arc can flow laterally by the middle arc induction compartment and the lower arc induction compartment. Thus, when a plurality of distributing boards are arranged in parallel, only distributing boards located at both sides are provided with the side arc ventilation compartment, thereby reducing an installation space.

DETAILED DESCRIPTION OF THE PREFERRED EMBODIMENT

Figure 1:
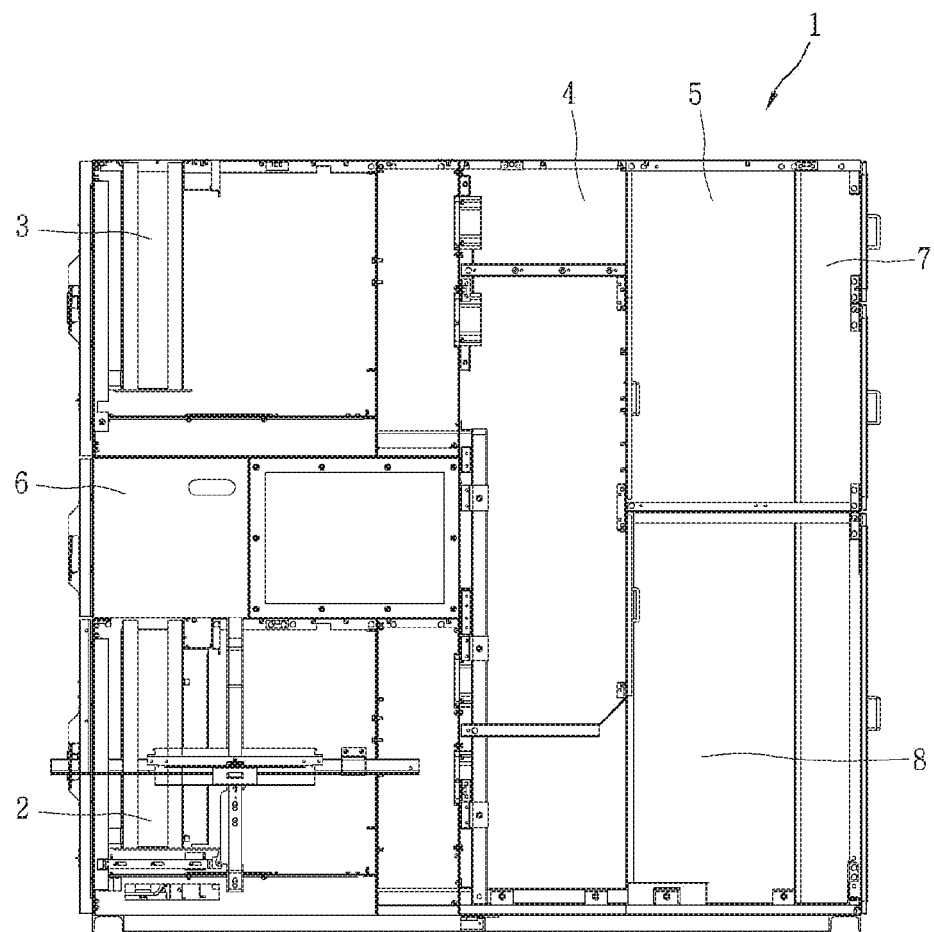
FIG. 1 is a lateral view of a multi-stage distributing board according to the related art.

Hereinafter, preferred embodiments of the present invention will be described with reference to the accompanying drawings, so that a person skilled in the art can easily carry out the invention. It should be understood that the technical idea and scope of the present invention are not limited to those preferred embodiments.

An arc ventilation system of a multi-stage distributing board according to each embodiment of the present invention will be described in detail with reference to the drawings.

An arc ventilation system 10 of a multi-stage distributing board according to one embodiment of the present invention includes a first compartment 12 installed at a first stage, a second compartment 13 installed at a second stage disposed above the first stage, a side arc discharge compartment 40 provided at one side of the first compartment 12 and the second compartment 13, a and a middle arc induction compartment 14 provided between the first compartment 12 and the second compartment 13 and communicating with the side arc discharge compartment 40.

Figure 2:
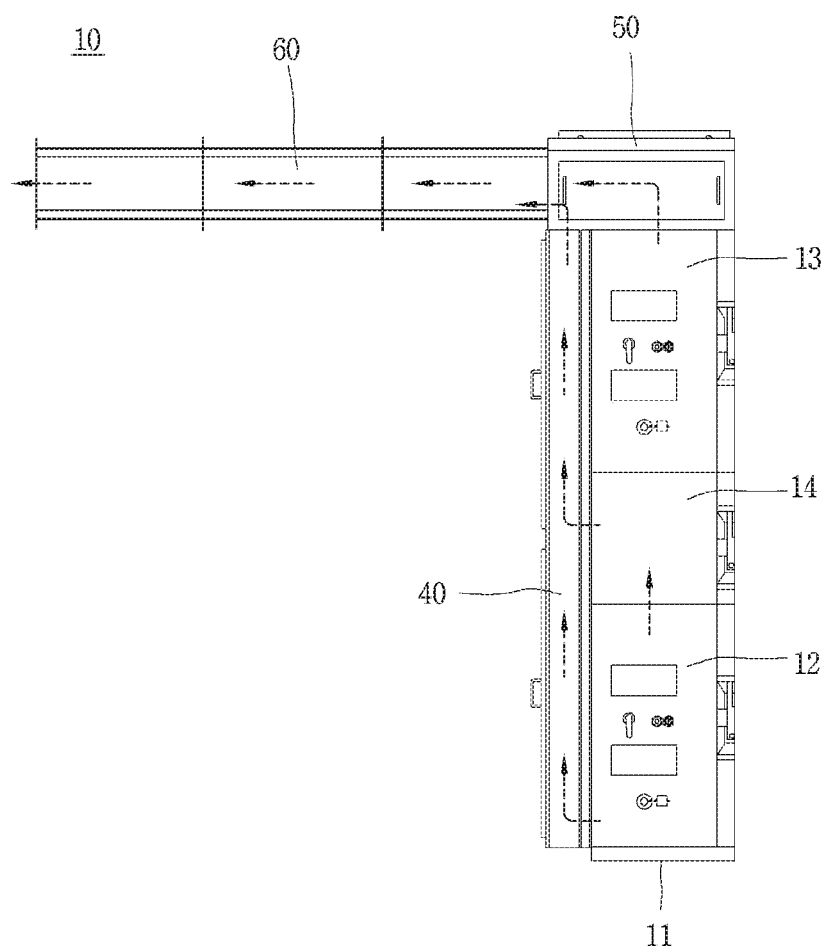
FIG. 2 is a front view of an arc ventilation system of a multi-stage distributing board in accordance with one embodiment of the present invention.
Figure 3:
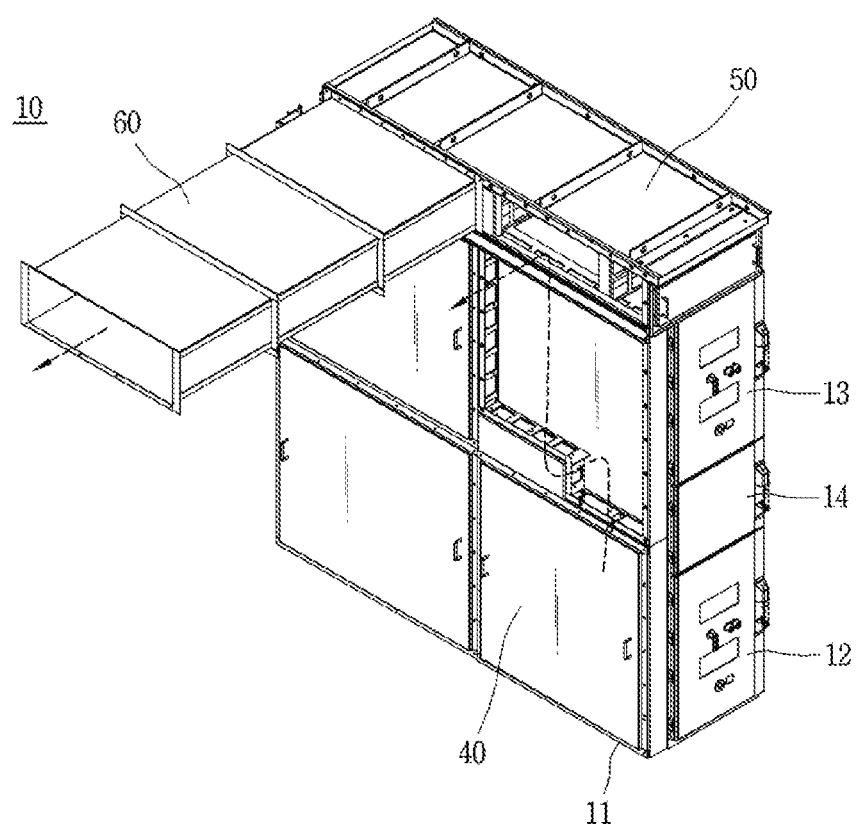
FIG. 3 is a perspective view of FIG. 2, which illustrates a state where one of arc ventilation ducts provided on an upper part and a part of a side arc ventilation compartment have been removed.
Figure 4:
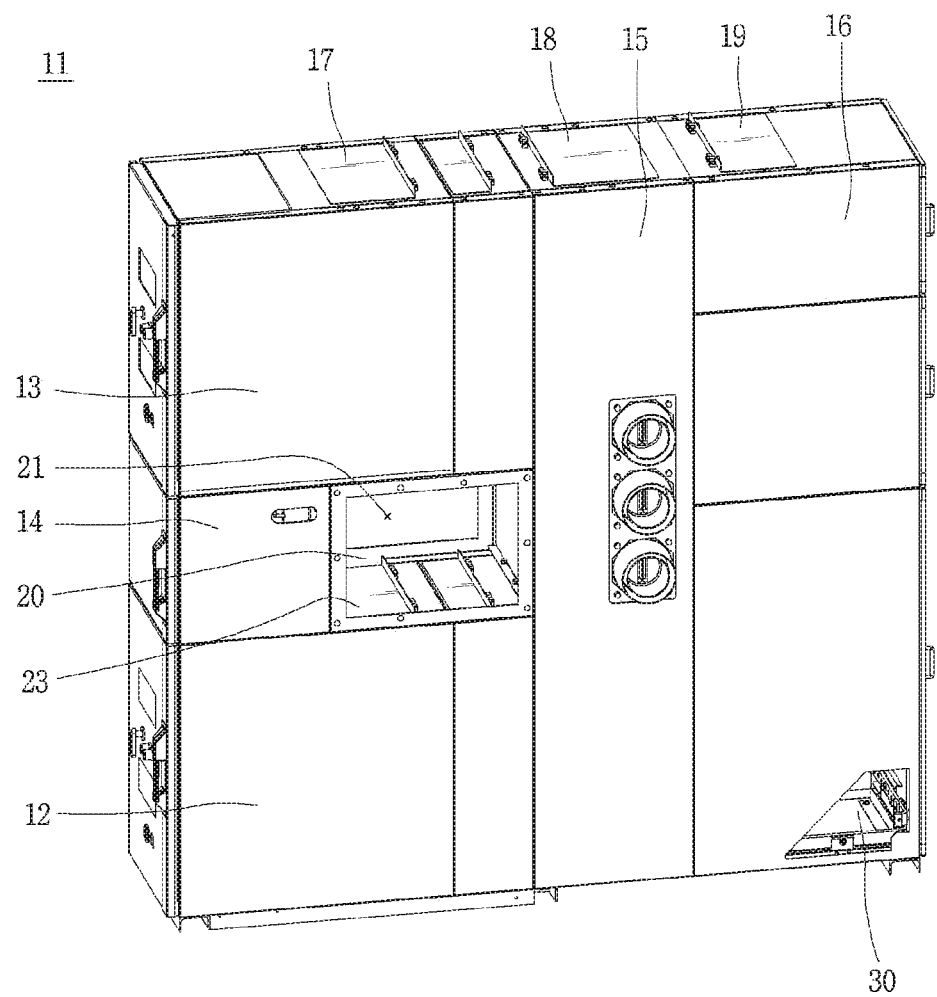
FIG. 4 is a perspective view of an enclosure of a multi-stage distributing board in accordance with one embodiment of the present invention.
Figure 5:
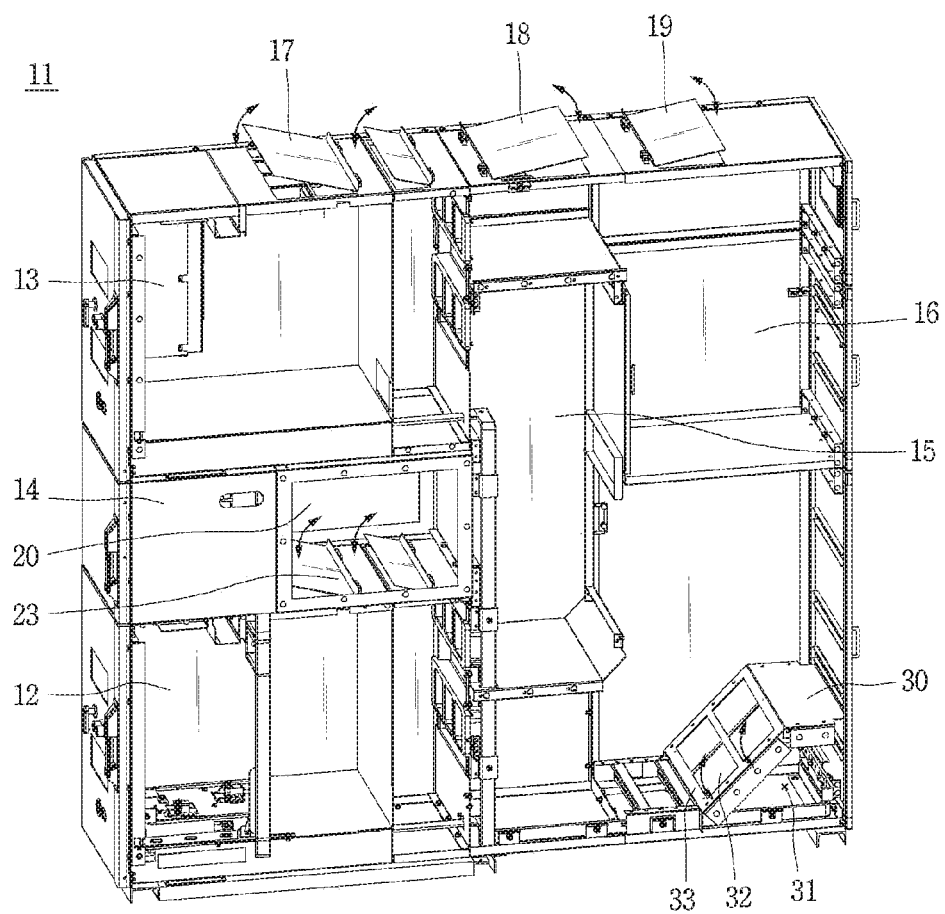
FIG. 5 is an internal structural view in a state where side panels are removed from FIG. 4.

First, description will be given with reference to FIGS. 2 to 5. FIG. 2 is a front view of an arc ventilation system of a multi-stage distributing board according to one embodiment of the present invention, FIG. 3 is a perspective view illustrating a state where a part is removed from FIG. 2, FIG. 4 is a perspective view of an enclosure of the multi-stage distributing board, and FIG. 5 is an internal structural view of the enclosure. (Arrows in FIGS. 2 and 3 indicate a movement path of an arc).

An enclosure (or cabinet) 11 of a distributing board will be described first. An enclosure 11 of a distributing board according to one embodiment of the present invention is divided into a plurality of compartments. In an example, the enclosure 11 of the distributing board may include breaker compartments (first and second compartments 12 and 13), a low voltage compartment 14, a bus bar compartment 15 and a cable compartment 16.

The multi-stage distributing board includes compartments provided at each of two or more stages. A compartment provided at a first stage (lower stage or lower part) of the enclosure 11 is referred to as a first compartment (first breaker compartment) 12 and a compartment provided at a second stage (upper stage or upper part) is referred to as a second compartment (second breaker compartment) 13. The first compartment 12 and the second compartment 13 are mainly used as breaker compartments. Description of a circuit breaker is omitted.

A low voltage compartment 14 is provided between the first compartment 12 and the second compartment 13. At this time, the low voltage compartment 14 is formed to be shorter in length (in back and forth directions) than the first compartment 12 and the second compartment 13. The low voltage compartment 14 may accommodate therein a low voltage device, a potential transformer, a current transformer, an accessory device, and the like.

A bus bar compartment 15 and a cable compartment 16 are sequentially provided at the rear of the first compartment 12 and the second compartment 13.

A middle arc induction compartment (or first arc induction compartment) 20 is provided at a middle stage between the first compartment 12 and the second compartment 13. The middle arc induction compartment 20 may be provided at the same height as the low voltage compartment 14. At this time, the middle arc induction compartment 20 is provided at the rear of the low voltage compartment 14. This is to allow the middle arc induction compartment 20 to be arranged adjacent to a terminal of a circuit breaker (not shown). The middle arc induction compartment 20 is brought into contact with the low voltage compartment 14 disposed at the front thereof, the first compartment 12 disposed at a bottom, and the second compartment 13 disposed at a top.

Figure 6:
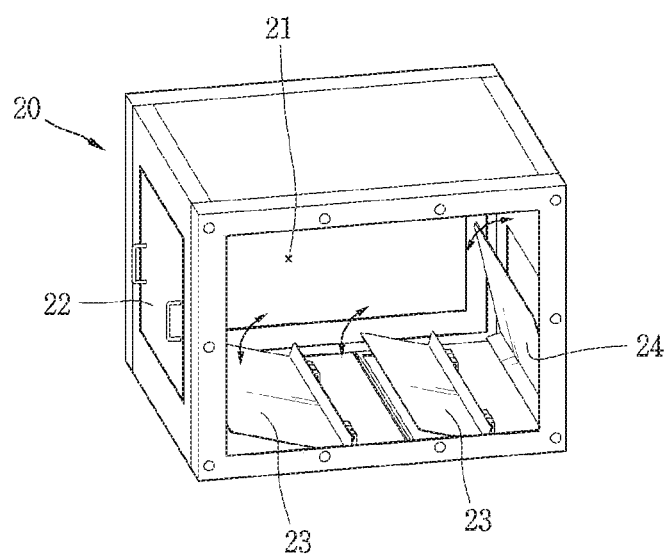
FIG. 6 is a perspective view of a middle arc induction compartment in FIG. 5.

The middle arc induction compartment 20 will be described additionally with reference to FIG. 6. The middle arc induction compartment 20 has left and right side surfaces opened. That is, first openings 21 are formed on the left and right side surfaces of the middle arc induction compartment 20, respectively. Accordingly, the middle arc induction compartment 20 becomes a passage through which arc gas can be introduced therein and also flows to the left and right.

A door 22 which is accessible through the low voltage compartment 14 is provided on a front surface of the middle arc induction compartment 20.

A plurality of first flaps 23 are provided on a lower surface of the middle arc induction compartment 20. The first flaps 23 are installed to be opened in a rotating manner. For example, each of the first flaps 23 has one side coupled by hinges. When the first flaps 23 are opened, an upper surface of the first compartment 12 of the lower stage is opened. Accordingly, the opened upper surface becomes a discharge (or ventilation) passage of arc gas generated in the first compartment 12. When arc gas is generated in the first compartment 12, the first flaps 23 are opened by pressure of the arc gas, and the arc gas flows to sides through the left and right first openings 21.

A second flap 24 is rotatably provided on a rear surface of the middle arc induction compartment 20. For example, the second flap 24 may be coupled to the rear surface by hinges. At this time, a lower end of the second flap 24 is coupled by hinges so that the second flap 24 is opened upward. As a result, arc gas generated in a lower portion of the bus bar compartment 15 is easily introduced.

The second flap 24 is brought into contact with the bus bar compartment 15. Therefore, when arc gas is generated in the bus bar compartment 15, the second flap 24 is opened forward by pressure of the arc gas, and the arc gas flows to sides through the first openings 21 via the middle arc induction compartment 20.

A lower arc induction compartment (second arc induction compartment) 30 is provided in a lower corner of the cable compartment 16. The lower arc induction compartment 30 is provided with second openings 31 on left and right side surfaces thereof. Accordingly, arc gas flowing into the lower arc induction compartment 30 can flow to sides through the second openings 31.

A third flap 32 is provided on a front surface of the lower arc induction compartment 30. The third flap 32 is coupled to the front surface by hinges to be rotatable. Alternatively, the third flap 32 may be weakly welded or supported by a weak support (not shown). When gas pressure is applied due to an arc generated in the cable compartment 16, the third flap 32 is rotated to be opened or separated and thus a front portion is opened. A front frame 33 may be formed in a lattice shape.

The third flap 32 is installed in an inclined direction. That is, the third flap 32 is installed to be inclined toward a corner in a diagonal direction of the cable compartment 16. Accordingly, the third flap 32 can widely work in correspondence to arcs generated in upper, lower, and central regions of the cable compartment 16. The front frame 33 is inclined at a predetermined angle so that the third flap 32 can be installed in the inclined direction.

The lower arc induction compartment 30 is provided inside the cable compartment 16. Therefore, since the lower arc induction compartment 30 does not occupy a separate space, a size of the enclosure 11 can be made compact.

As described above, arc gas can flow laterally by the middle arc induction compartment 20 and the lower arc induction compartment 30. Referring to FIG. 4, the enclosure 11 of the distributing board is provided with an arc ventilation passage (or path) along which an arc flows through the distributing board by each arc induction compartment 20, 30.

A fourth flap 17, a fifth flap 18 and a sixth flap 19 are rotatably provided on a top surface of the enclosure 11, that is, upper surfaces of the second compartment 13, the bus bar compartment 15, and the cable compartment 16, respectively. Each flap 17, 18, 19 may be coupled by hinges. When arcs are generated in the second compartment 13, the bus bar compartment 15 and the cable compartment 16, each of flaps 17, 18 and 19 is opened by pressure of arc gas.

Hereinafter, an arc ventilation compartment and an arc ventilation duct coupled to the enclosure 11 of the distributing board will be described.

Figure 7:
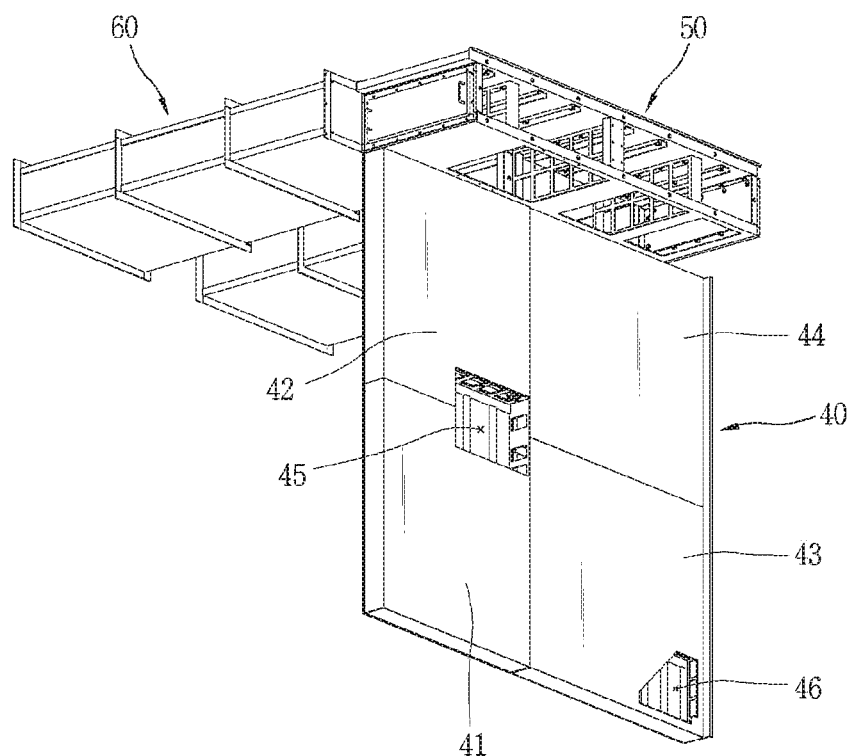
FIG. 7 is a perspective view of an arc ventilation compartment of a multi-stage distributing board in accordance with one embodiment of the present invention, in which a side arc ventilation compartment, an upper arc ventilation compartment, and an arc ventilation duct are shown.
Figure 8:
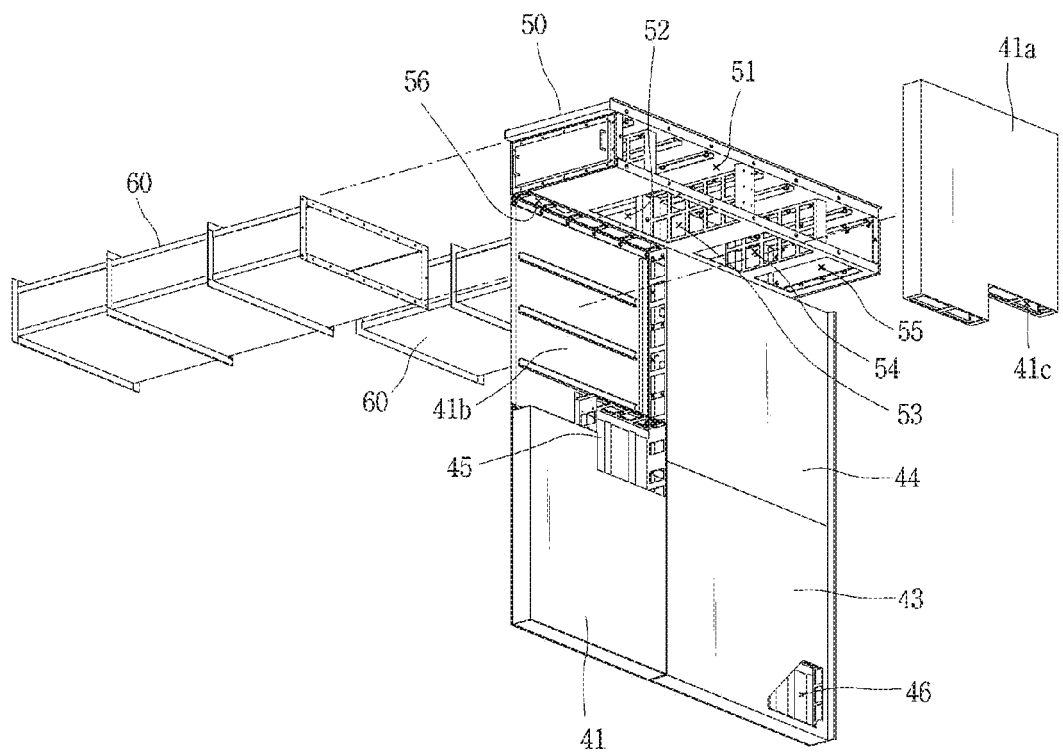
FIG. 8 is a view illustrating a state in which a part of a first compartment is separated from FIG. 7.

The description will be given with reference to FIGS. 2, 3, 7, and 8. FIG. 7 shows a side arc ventilation compartment 40, an upper arc ventilation compartment 50 and an arc ventilation duct 60, and FIG. 8 shows a state where one side surface of a second compartment and one of arc ventilation ducts are removed from FIG. 7.

A side arc ventilation compartment 40 is installed on one side of the enclosure 11. The side arc ventilation compartment 40 may be provided with a plurality of compartments. At this time, each of the plurality of compartments may be formed in a manner of dividing the side arc ventilation compartment 40 into predetermined sections. For example, the side arc ventilation compartment 40 may be divided into a first side compartment 41 brought into contact with the first compartment 12 and a second side compartment 42 brought into contact with the second compartment 13.

Also, the side arc ventilation compartment 40 may be divided into a third side compartment 43 and a fourth side compartment 44 disposed up and down, respectively, at portions corresponding to the bus bar compartment 15 and the cable compartment 16. Such compartment division is not essential and may be made considering a size of the side arc ventilation compartment 40 and relationship with each compartment of the enclosure 11.

Each of the side compartments 41, 42, 43 and 44 may be formed by a pair of side plates (for example, 41a and 41b of the first side compartment) arranged side by side and frames (for example, 41c of the first side compartment) connecting edges of each side plate to form a width. At this time, each frame 41c may be formed in a lattice shape. Accordingly, arc gas can flow between the frames 41c. An inside of each of the compartments 41, 42, 43, and 44 is formed in an empty state.

A middle arc introduction compartment 45 is provided at a position corresponding to the middle arc induction compartment 20. A side surface of the middle arc introduction compartment 45 which is brought into contact with the middle arc induction compartment 20 is opened. Accordingly, arc gas introduced into the middle arc induction compartment 20 flows into the middle arc introduction compartment 45 through the first openings 21 and then flows into an upper arc ventilation compartment 50 through the second side compartment 42.

A lower arc introduction compartment 46 is provided in a lower corner of the side arc ventilation compartment 40 at a position corresponding to the lower arc induction compartment 30. A side surface of the lower arc introduction compartment 46 which is brought into contact with the lower arc induction compartment 30 is opened. Accordingly, arc gas introduced into the lower arc induction compartment 30 flows into the lower arc introduction compartment 46 through the second opening 31 and then flows into the upper arc ventilation compartment 50 through the third side compartment 43 and the fourth side compartment 44.

The upper arc ventilation compartment 50 is provided on an upper part of the enclosure 11. The upper arc ventilation compartment 50 is installed on upper parts of the enclosure 11 and the side arc ventilation compartment 40. The upper arc ventilation compartment 50 receives arc gas introduced from the upper part of the enclosure 11 and the upper part of the side arc ventilation compartment 40. Such introduced arc gas is discharged out through the arc ventilation duct 60.

The upper arc ventilation compartment 50 has left and right side surfaces opened. That is, the upper arc ventilation compartment 50 is provided with first and second side openings 51 and 52. Accordingly, the upper arc ventilation compartment 50 may be connected in plurality and thus the plurality of upper arc ventilation compartments can be used as an arc ventilation passage along which arc gas flows laterally.

The upper arc ventilation compartment 50 is provided at its lower surface with first lower openings 53, 54 and 55 communicating with an upper surface of the enclosure 11, and a second lower opening 56 communicating with an upper surface of the side arc ventilation compartment 40. Arc gas discharged from the upper surface of the enclosure 11 flows into the upper arc ventilation compartment 50 and the arc ventilation duct 60 through the first lower openings 53, 54 and 55, and arc gas discharged from the side arc ventilation compartment 40 flows into the upper arc ventilation compartment 50 and the arc ventilation duct 60 through the second lower opening 56.

The arc ventilation duct 60 is installed at one side of the upper arc ventilation compartment 50. One end of the arc ventilation duct 60 communicates with one side of the upper arc ventilation compartment 50. The arc ventilation duct 60 may be divided into a plurality of portions and coupled to the upper arc ventilation compartment 50. The arc ventilation duct 60 allows arc gas to be finally discharged to outside and causes an increase in time required for cooling.

Hereinafter, an operation of an arc ventilation system of a multi-stage distributing board according to one embodiment of the present invention will be described.

First, when an arc is generated in the first compartment 12, a ventilation (or discharge) path of the arc gas is formed as follows.

First compartment 12→Middle arc induction compartment 20→Middle arc introduction compartment 45→Second side compartment 42→Upper arc ventilation compartment 50→Arc ventilation duct 60.

When an arc is generated in the first compartment 12, the arc gas is discharged out through the arc ventilation duct 60 sequentially via the first compartment 12, the middle arc induction compartment 20, the middle arc introduction compartment 45, the second side compartment 42, and the upper arc ventilation compartment 50. Specifically, when an arc is generated in the first compartment 12, the first flaps 23 are opened by pressure of the arc gas so that the arc gas flows from the first compartment 12 to the middle arc induction compartment 20. Afterwards, the arc gas flows laterally into the middle arc introduction compartment 45 of the side arc ventilation compartment 40 through the first openings 21 of the middle arc induction compartment 20. The arc gas then flows upward to the upper arc ventilation compartment 50 through the second lower opening 56 via the second side compartment 42. Thereafter, the arc gas flows laterally to outside through the arc ventilation duct 60 via the second side opening 52.

Arc generated in a lower end of the distributing board bypasses the second compartment 13 of an upper end of the distributing board along such a path, so as to be ventilated through the arc ventilation duct 60 via the side arc ventilation compartment 40 and the upper arc ventilation compartment 50.

Next, when an arc is generated in the second compartment 13, a ventilation path of the arc gas is as follows.

Second compartment 13→Upper arc ventilation compartment 50→Arc ventilation duct 60

When an arc is generated in the second compartment 13, the fourth flap 17 is opened by pressure of the arc gas. The arc gas flows to the upper arc ventilation compartment 50 through the first lower opening 53, and then flows to the arc ventilation duct 60 through the second side opening 52.

When an arc is generated in the bus bar compartment 15 or the cable compartment 16, a ventilation path of the arc gas is as follows.

First path: Bus bar compartment 15 or Cable compartment 16→Middle arc induction compartment 20→Middle arc introduction compartment 45→Second side compartment 42→Upper arc ventilation compartment 50→Arc ventilation duct 60

Second path: Bus bar compartment 15 or Cable compartment 16→Lower arc induction compartment 30→Lower arc introduction compartment 46→Third and fourth side compartments 43, 44→Upper arc ventilation compartment 50→Arc ventilation duct 60

Third path: Bus bar compartment 15 or Cable compartment 16→Upper arc ventilation compartment 50→Arc ventilation duct 60

When an arc is generated in the bus bar compartment 15 or the cable compartment 16, the second flap 24 and the third flap 32 are opened by pressure of the arc gas. Accordingly, a part of the arc gas flows into the middle arc induction compartment 20 through the second flap 24, and a part of the arc gas flows into the lower arc induction compartment 30 through the third flap 32. The remaining arc gas flows into the upper arc ventilation compartment 50 through the fifth and sixth flaps 18, 19.

Here, the arc gas introduced into the middle arc induction compartment 20 flows into the middle arc introduction compartment 45 through the first openings 21 and then flows into the upper arc ventilation compartment 50 through the second lower opening 56 via the second side compartment 42. Afterwards, the arc gas flows to the arc ventilation duct 60 through the second side opening 52.

The arc gas introduced into the lower arc induction compartment 30 flows into the upper arc ventilation compartment 50 sequentially via the lower arc introduction compartment 46 and the third and fourth side compartments 43 and 44 of the side arc ventilation compartment 40. Thereafter, the arc gas moves to the arc ventilation duct 60.

In this manner, when an arc is generated in a lower compartment, the arc flows to outside along an arc ventilation path which bypasses to the middle arc induction compartment 20 or the lower arc induction compartment 30 and extends to the outside. Therefore, the arc gas does not affect compartments or electric devices provided at a top of the distributing board.

Figure 9:
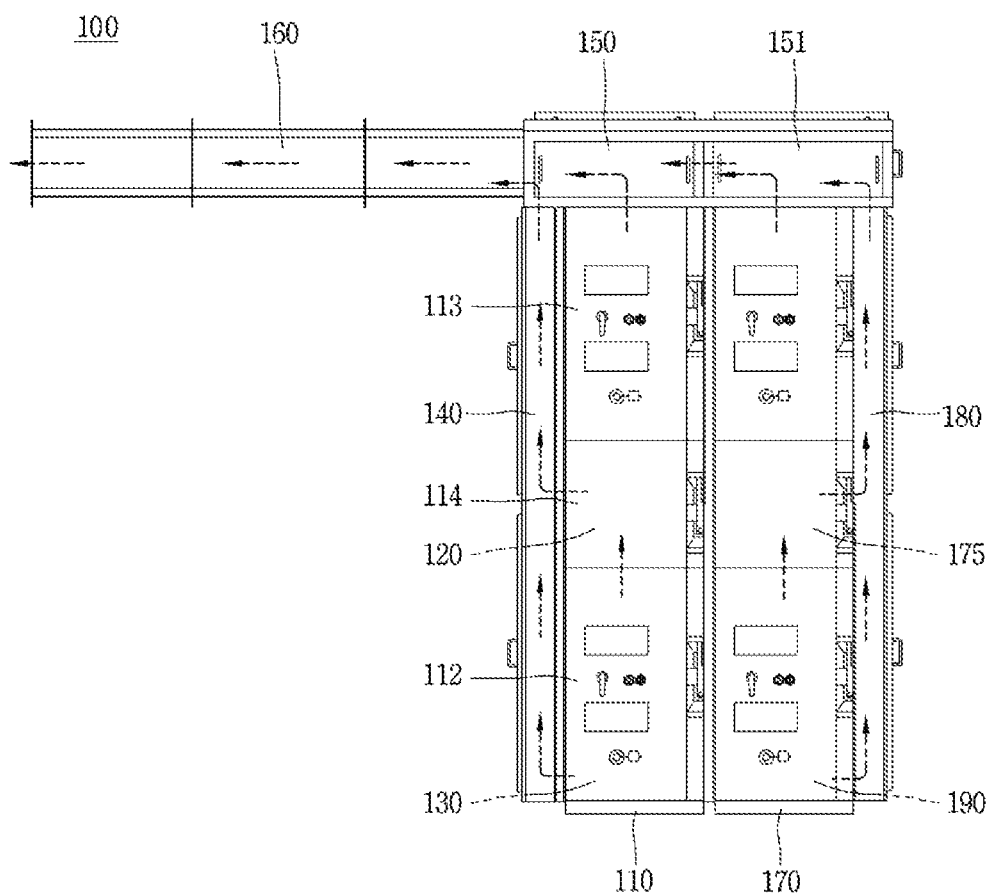
FIG. 9 is a front view of an arc ventilation system of a multi-stage distributing board in accordance with another embodiment of the present invention, which illustrates an arc ventilation system in a state where a plurality of distributing boards are arranged in parallel.

FIG. 9 shows an arc ventilation system 100 of a multi-stage distributing board according to another embodiment of the present invention. (Arrows in FIG. 9 indicate a movement path of an arc).

In this embodiment, a plurality of distributing boards are arranged side by side. An enclosure of a distributing board arranged at the left in the drawing is referred to as a first enclosure 110, and an enclosure of a distributing board arranged at the right in the drawing is referred to as a second enclosure 170.

The first enclosure 110 and arc ventilation compartments coupled thereto are the same as those in the previous embodiment.

The first enclosure 110, similar to that in the previous embodiment, is provided with a first compartment 112 disposed at a first stage (lower stage) and a second compartment 113 disposed at a second stage (upper state). A low voltage compartment 114 and a middle arc induction compartment 120 are provided between the first compartment 112 and the second compartment 113.

A first side arc ventilation compartment 140 is provided on one side (left side in the drawing) of the first enclosure 110 and a first upper arc ventilation compartment 150 is provided on an upper part of the first enclosure 110. An arc ventilation duct 160 is installed at one side of the first upper arc ventilation compartment 150.

A second side arc ventilation compartment 180 is installed at another side (right side in the drawing) of the second enclosure 170. A second upper arc ventilation compartment 151 is installed on an upper part of the second enclosure 170. Here, the second upper arc ventilation compartment 151 is connected to the first upper arc ventilation compartment 150. The first upper arc ventilation compartment 150 and the second upper arc ventilation compartment 151 may be integrally fabricated with each other.

A middle arc induction compartment 120 of the first enclosure 110 and a middle arc induction compartment 175 of the second enclosure 170 have side surfaces thereof opened so as to communicate with each other, thereby forming an arc gas ventilation path along which the arc gas flows laterally.

Also, a lower arc induction compartment 130 of the first enclosure 110 and a lower arc induction compartment 190 of the second enclosure 170 have side surfaces thereof opened so as to communicate with each other, thereby forming an arc gas ventilation path along which the arc gas flows laterally.

For example, an arc ventilation path in the case where an arc is generated in the first compartment (reference numeral not given) disposed at the lower stage of the first enclosure 110 is formed as follows.

First path: First compartment of the first enclosure 110→Middle arc induction compartment 120 of the first enclosure 110→First side arc ventilation compartment 140→First upper arc ventilation compartment 150→Arc discharge duct 160

Second path: First compartment of the first enclosure 110→Middle arc induction compartment 120 of the first enclosure 110→Middle arc induction compartment 175 of the second enclosure 170→Second side arc ventilation compartment 180→Second upper arc ventilation compartment 151→First upper arc ventilation compartment 150→Arc ventilation duct 160

Detailed flows of arc gas are the same as those described in the previous embodiment, and thus description thereof will not be given separately.

In this embodiment, since lateral flow paths of arc gas are constructed when a plurality of distributing boards are arranged side by side, cooling and ventilation can occur efficiently.

Although not shown separately, a case where three or more distributing boards are provided in relation to this embodiment will be described as follows.

Enclosures of respective distributing boards are arranged side by side in a contact manner. Therefore, a space occupied by the distributing boards does not increase. A side arc ventilation compartment is installed on a side surface of an outermost distributing board. That is, a first side arc ventilation compartment is provided at a left side of a distributing board located at the leftmost side, and a second side arc ventilation compartment is provided at a right side of a distributing board located at the rightmost side. Each distributing board has an arc ventilation path which communicates in a lateral direction by a middle arc induction compartment and a lower arc induction compartment.

An upper arc ventilation compartment is provided on an upper part of an enclosure of each distributing board, and an arc ventilation duct is connected to the upper left arc ventilation compartment at the leftmost or rightmost side.

According to an arc ventilation system of a multi-stage distributing board according to each embodiment of the present invention, a middle arc induction compartment is provided between an upper compartment and a lower compartment, so as to prevent an arc generated in the lower compartment from damaging the upper compartment.

Also, since an arc gas introduced into the middle arc induction compartment flows upward through a side arc ventilation compartment, a time required for cooling the arc gas can increase.

Thus, the arc gas generated in the lower compartment can be effectively discharged and cooled without causing damage on the upper compartment, owing to a bypass or detour route formed by the middle arc induction compartment and the side arc ventilation compartment.

In addition, a lower arc induction compartment is provided beneath a cable compartment so that an arc generated in a bus bar compartment or the cable compartment is effectively ventilated to the side arc ventilation compartment.

Also, an arc can flow laterally by the middle arc induction compartment and the lower arc induction compartment. Thus, when a plurality of distributing boards are arranged in parallel, only distributing boards located at both sides are provided with the side arc ventilation compartment, thereby reducing an installation space.

While the invention has been shown and described with reference to the foregoing preferred embodiments thereof, it will be understood by those skilled in the art that various changes and modifications may be made without departing from the spirit and scope of the invention as defined by the appended claims. Therefore, the embodiments disclosed in the present invention are not intended to limit the scope of the present invention but are merely illustrative, and it should be understood that the scope of the technical idea of the present invention is not limited by those embodiments. That is, the scope of protection of the present invention should be construed according to the appended claims, and all technical ideas within the scope of equivalents thereof should be construed as being included in the scope of the present invention.

What is claimed is:

1. An arc ventilation system of a multi-stage distributing board, the system comprising:
    a first compartment provided at a first stage of an enclosure of the multi-stage distributing board;
    a second compartment provided at a second stage located above the first stage;
    a side arc ventilation compartment provided at one side of the first compartment and the second compartment; and
    a middle arc induction compartment provided between the first compartment and the second compartment and communicating with the side arc ventilation compartment,
    wherein the middle arc induction compartment is provided with a plurality of first flaps rotatably installed on a lower surface thereof.

2. The arc ventilation system of claim 1, wherein the middle arc induction compartment is provided with first openings formed on left and right side surfaces, respectively.

3. The arc ventilation system of claim 1, wherein the middle arc induction compartment is provided with a second flap rotatably installed on a rear surface thereof.

4. The arc ventilation system of claim 1, wherein a lower arc induction compartment is provided in a lower corner of a cable compartment provided at the rear of the first compartment and the second compartment.

5. The arc ventilation system of claim 4, wherein the middle arc induction compartment is provided with second openings formed on left and right surfaces thereof, respectively.

6. The arc ventilation system of claim 4, wherein the lower arc induction compartment is provided with a third flap installed on a front surface thereof in an inclined direction.

7. The arc ventilation system of claim 4, wherein a fourth flap, a fifth flap, and a sixth flap are rotatably installed on upper surfaces of the second compartment, a bus bar compartment, and the cable compartment, respectively.

8. The arc ventilation system of claim 4, wherein the side arc ventilation compartment is provided with a lower arc introduction compartment at a position corresponding to the lower arc induction compartment.

9. The arc ventilation system of claim 8, wherein the lower arc introduction compartment has a side surface opened, wherein the side surface is brought into contact with the lower arc introduction compartment.

10. The arc ventilation system of claim 4, wherein the enclosure and the side arc ventilation compartment are provided with an upper arc ventilation compartment disposed on upper parts thereof.

11. The arc ventilation system of claim 1, wherein the side arc ventilation compartment is divided into a plurality of compartments.

12. The arc ventilation system of claim 1, wherein the side arc ventilation compartment is provided with a middle arc introduction compartment at a position corresponding to the middle arc induction compartment.

13. The arc ventilation system of claim 12, wherein the middle arc introduction compartment has a side surface opened, wherein the side surface is brought into contact with the middle arc induction compartment.

14. The arc ventilation system of claim 1, wherein the enclosure comprises a plurality of enclosures, wherein the plurality of enclosures are arranged in parallel in a contacting manner, and
    wherein the side arc ventilation compartment is installed at each of a right side of a rightmost enclosure and a left side of a leftmost enclosure among the plurality of enclosures.

* * * * *